Aug. 24, 1926.

H. A. SELAH

CONDUIT FITTING

Filed Oct. 14, 1924

1,597,486

Inventor
Howard A. Selah
By N L Lind
Attorney

Patented Aug. 24, 1926.

1,597,486

UNITED STATES PATENT OFFICE.

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed October 14, 1924. Serial No. 743,629.

Conduit fittings have ordinarily been made with screw threaded connections for connecting the fittings, boxes, couplings and the like with the conduit tubes. These tubes are often bent to adapt them to the places in which they are used and under such conditions it is difficult to screw them into the fittings requiring the use of supplemental couplings and devices for making the connections. Further the screw threading of the conduit tubes directly into the fittings involves the screw threading of these tubes ordinarily on the job inasmuch as the lengths of the different positions cannot ordinarily be ascertained in advance. The present invention is designed to form conduit fittings which will receive unthreaded lengths of conduit and secure the same to the fittings such as boxes, couplings and the like. Features of the invention will appear from the specification and claims.

The invention is illustrated and exemplified in the form of a conduit box as follows:—

Figure 1:
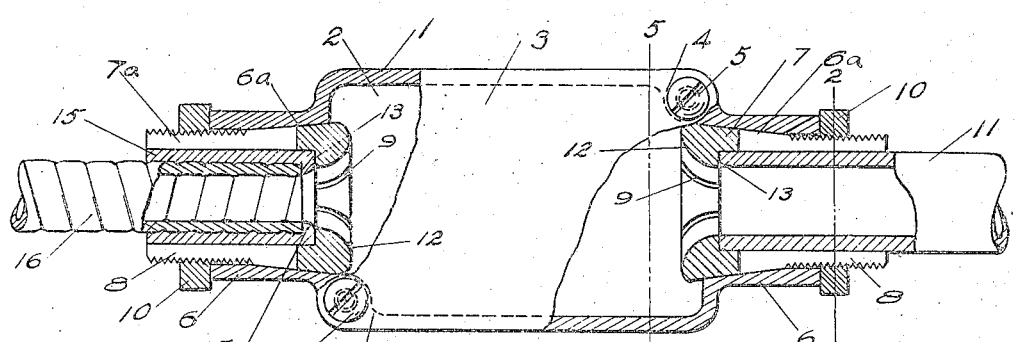

Fig. 1 shows a side elevation, partly in section, of a conduit box.

Figure 2:
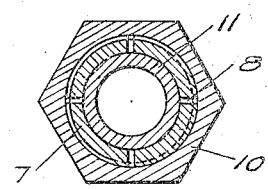

Fig. 2 a section on the line 2—2 in Fig. 1.

Figure 3:
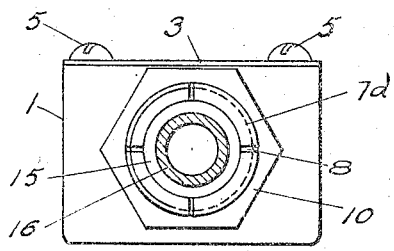

Fig. 3 an end elevation of the box.

Figure 4:
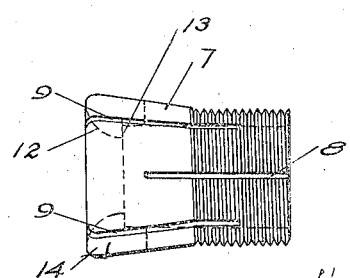

Fig. 4 a side elevation of the contractible ring.

Figure 5:
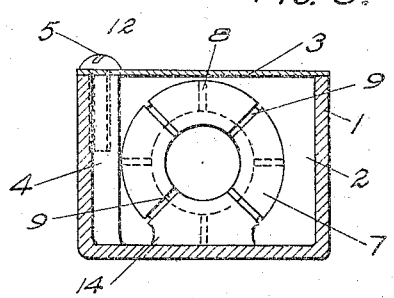

Fig. 5 a section on the line 5—5 in Fig. 1.

1 marks the fitting box having the chamber 2 and the removable cover plate 3. The box has the slight enlargements 4 in its walls at the opposing corners into which screws 5 securing the plate extend. By making these enlargements in the extreme corners full access to the box is permitted.

The box has extensions 6 in which are arranged tapered openings 6ª. A contractible sleeve 7 is arranged in the opening 6ª, the sleeve having a tapered surface conforming to the tapered surface of the opening. The sleeve 7 is preferably made contractible by slits 8 extending inwardly from the outer end and slits 9 extending into the sleeve from the inner end of the sleeve. These slits preferably overlap or extend up each other so that as the sleeve is drawn into the tapered opening there is a contracting of the sleeve throughout. The outer end of the sleeve is screw-threaded and a nut 10 is placed upon it which operating on the end of the extension 6 draws the contractible sleeve into the opening and into clamping engagement with the conduit tube 11.

I prefer to provide a rounded lead shoulder 12 at the inner end of the sleeve which projects inwardly so as to cover and protect the conduit, as it is drawn through the tube, from the cutting edge of the conduit. This rounded lead shoulder forms a stop 13 which also positions the tube in the sleeve.

It is desirable to provide means for preventing the turning of the sleeve so that the nut 10 may be readily turned in place. This is accomplished by a projecting lug 14 which engages the wall of the box and prevents the turning of the sleeve. The lug is placed so that the slits 9 will be directed away from the box or side opening so that as conductors are drawn through the opening of the box and around the end of the sleeve 7 they do not rub along the edges of one of the slits.

It is sometimes desirable to secure a flexible conduit as 16 with a fitting and this is accomplished in the present instance by providing a soft metallic tube die casting 15, the die casting having preferably a screw shaped interior which will conform to the usual threaded or spiral exterior surface of the flexible tube. The soft tube is screwed upon the flexible tube, placed in a sleeve 7ª similar to the sleeve 7 and this is drawn into the opening in the same manner as at the opposite end of the box clamping the sleeve on the soft tube and compressing the same so that it forms in effect not only a clamping means but a gasket around the tube In order to protect the conduit from the edge of the flexible tube 16 the die casting 15 has a shoulder 15ª which extends over the end of the flexible tube 16 and continues the flaring shoulder 12. This permits of the use of the sleeve 7ª exactly similar to the ring 7 used with the ordinary conduit 11.

While I have shown a two-opening conduit box with a removable side plate it will be understood that the box may be provided with any of the various combinations of openings usual with such fittings and that it may be provided with a removable cover or cover formed integral, thus forming an ordinary coupling.

What I claim as new is:—

1. A conduit fitting comprising means permitting the entry thereinto of an unthreaded conduit end, a hollow gripping member in said entry means adapted to surround said conduit and including means permitting the contraction of said member to grip the conduit around its periphery, said member and said entry means also including means to contract said member on longitudinal movement of the latter away from the inside of the fitting and means operable on the outside of said fitting, the fitting, gripping member and operable means also including means for moving said gripping member in the direction stated to to cause the latter to grip the conduit.

2. A conduit fitting comprising means permitting the entry thereinto of an unthreaded conduit end, a hollow gripping member in said entry means adapted to surround said conduit and including means permitting the contraction of said member to grip the conduit around its periphery and along substantially the full length of said member, said member and said entry means also including means to contract said member on longitudinal movement of the latter away from the inside of the fitting and means operable on the outside of said fitting, the fitting, gripping member and operable means also including means for moving said gripping member in the direction stated to cause the latter to grip the conduit.

3. A conduit fitting comprising means permitting the entry thereinto of an unthreaded conduit end, a hollow gripping member in said entry means adapted to surround said conduit and including means permitting the contraction of said member to grip the conduit around its periphery, said member having an internal stop shoulder at its inner end, said member and said entry means also including means to contract said member on longitudinal movement of the latter away from the inside of the fitting and means operable on the outside of said fitting, the fitting, gripping member and operable means also including means for moving said gripping member in the direction stated to cause the latter to grip the conduit.

4. A conduit fitting comprising means permitting the entry thereinto of an unthreaded conduit end, a hollow gripping member in said entry means adapted to surround said conduit and including means permitting the contraction of said member to grip the conduit around its periphery, said member and said entry means also including means to contract said member on longitudinal movement of the latter away from the inside of the fitting and means operable on the outside of said fitting, the fitting, gripping member and operable means also including means comprising screw threads on the outer end of the member and a nut thereon for moving said gripping member in the direction stated to cause the latter to grip the conduit.

5. A conduit fitting comprising means permitting the entry thereinto of an unthreaded conduit end, a hollow gripping member in said entry means adapted to surround said conduit and including means permitting the contraction of said member to grip the conduit around its periphery, said member and said entry means also including means to contract said member and lock the same against turning on longitudinal movement of the latter away from the inside of the fitting and means operable on the outside of said fitting, the fitting, gripping member and operable means also including means comprising screw threads on the outer end of the member and a nut thereon for moving said gripping member in the direction stated to cause the latter to grip the conduit.

6. A conduit fitting comprising means permitting the entry thereinto of an unthreaded conduit end, a hollow gripping member in said entry means and removable inwardly therefrom adapted to surround said conduit and including means permitting the contraction of said member to grip the conduit around its periphery, said member and said entry means also including means to contract said member on longitudinal movement of the latter away from the inside of the fitting and means operable on the outside of said fitting, the fitting, gripping member and operable means also including means for moving said gripping member in the direction stated to cause the latter to grip the conduit.

7. A conduit fitting comprising means permitting the entry thereinto through an opening of an unthreaded conduit end and having a side opening, a hollow gripping member in said entry means adapted to surround said conduit and including means permitting the contraction of said member to grip the conduit around its periphery, said member having a continuous surface at its inner end adjacent the side opening, said member and said entry means also including means to contract said member on longitudinal movement of the latter away from the inside of the fitting and means operable on the outside of said fitting, the fitting, gripping member and operable means also including means for moving said gripping member in the direction stated to cause the latter to grip the conduit.

In testimony whereof I have hereunto set my hand.

H. A. SELAH.